United States Patent [19]
Falkowski et al.

[11] 4,337,219
[45] Jun. 29, 1982

[54] METHOD OF ENCAPSULATING ELECTRICAL COILS

[75] Inventors: Paul P. Falkowski, Clearwater; Erwin Spotz; Mangesh Rajadhyaksha, both of Largo, all of Fla.

[73] Assignee: Square D Company, Palatine, Ill.

[21] Appl. No.: 214,619

[22] Filed: Dec. 9, 1980

[51] Int. Cl.³ ............................................. B29C 6/02
[52] U.S. Cl. .................................. 264/130; 264/139; 264/264; 264/272.19
[58] Field of Search ........... 264/139, 157, 264, 272.13, 264/272.14, 272.19, 130

[56] References Cited

U.S. PATENT DOCUMENTS

| | | | |
|---|---|---|---|
| 787,199 | 4/1905 | Lloyd | 264/157 |
| 2,914,600 | 11/1959 | Smith et al. | 264/272.19 |
| 3,141,049 | 7/1964 | Parsons | 264/272.19 |
| 4,210,618 | 7/1980 | Piltz et al. | 264/264 |

FOREIGN PATENT DOCUMENTS 132591 3/1933 Austria ............................... 264/157
1759625 3/1971 Fed. Rep. of Germany ...... 264/157

Primary Examiner—James B. Lowe
Attorney, Agent, or Firm—Carmen B. Patti

[57] ABSTRACT

A method of producing encapsulated coils includes positioning a coil of wire on a inner coil adjacent one end thereof, positioning a metallic ring on the opposite end of the coil and surrounding the coil with an outer mold having a closed bottom, a resinous material is introduced to encapsulate the coil and provide a reservoir of excess resinous material which is then cured and the shrinkage is accommodated by the excess material above the ring. The encapsulated coil, ring, and excess material are removed from the molds and the ring and excess material are separated using a hammer to produce a finished encapsulated coil.

8 Claims, 6 Drawing Figures

METHOD OF ENCAPSULATING ELECTRICAL COILS

DESCRIPTION

1. Technical Field

The present invention relates generally to power transformer coils and, more specifically, to a process for casting resin electrical coils.

2. Background Prior Art

Cast resin power transformer coils have been in existence for some time. Usually, such coils are formed by first winding a mandrel utilizing a conventional lathe. The mandrel and the wound length of wire are then inserted into a mold and a liquid resin is introduced into the mold to completely immerse the wire within the resin. The resin is then cured while retained in the mold. During curing, the resin naturally shrinks to some degree and it is therefore necessary to provide excess resin in the mold to accommodate this shrinkage.

One known process that has been utilized for some time is that of placing a coil of wire on an inner mold, which is usually circular, and then surrounding the inner mold with an outer mold having a closed bottom and having a height that is greater than the length of coil. A liquid resin is then introduced into the space between the two molds and a sufficient amount of overpour of resin is disposed above the length of the coil. The resin is then allowed to cure and the molds are removed. The excess resin that extends beyond the coil must then be removed and it has been customary to utilize a saw or other cutting device for such removal. The final coil of predetermined length or height is then assembled on a grain-oriented silicone steel core.

The method described above requires substantial time and also results in a substantial health hazard because of the dust that is developed during the cutting operation. Furthermore, usually there is a substantial amount of excess material that is required which adds to the overall production costs.

SUMMARY OF THE INVENTION

According to the present invention, the above shortcomings of forming a resin electrical coil are overcome by the unique simplified process which eliminates the need for sawing and results in the production of a coil having a specified length or height.

According to the method aspect of the present invention, a cast resin electrical coil is formed by first placing a wound induction element around an inner mold and then surrounding the inner mold with an outer mold that has a closed bottom and an open top. A ring, having a release coating thereon, is then inserted into the space between the two molds and is positioned at the height from the bottom which will determine the final height or length of the coil. The ring has means that provide communication between the space above the ring and the space between the ring and the bottom of the outer mold. A resin material is then introduced between the molds in sufficient quantities to fill the space between the ring and the bottom and provide an excess amount of material above the release coated ring. The resin material is then allowed to cure and the molds are removed. After the molds are removed, the ring and the excess material are removed from the remainder of the coil to produce a substantially clean surface along the bottom surface of the release coated ring. This removal may be performed by striking the excess material in the area adjacent the ring with a hammer or mallet. The result is that the need for the cutting step heretofore deemed necessary is eliminated, thereby reducing the manpower required for producing the coils and also eliminates the potential health hazards.

According to one aspect of the present invention, in one form of the invention the communication through the adjustable ring is provided between the inner and outer edges of the ring and the adjacent surfaces of the respective molds to produce narrow circumferential annular openings through which resin material can flow. Alternatively, openings may be provided between the inner and outer edges of the ring and the ring sealed along the surfaces of the mold so that the communication is through the openings. In a further modified form, separate reservoirs are provided for each of the openings so that the excess resin material can flow into the reservoirs and then be returned during the shrinking and curing process.

BRIEF DESCRIPTION OF SEVERAL VIEWS OF DRAWINGS

DETAILED DESCRIPTION

Figure 1:
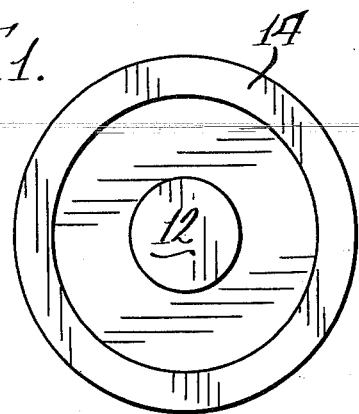
FIG. 1 shows a plan view of the mold utilized for carrying out the method of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the invention to the embodiments illustrated.

Figure 2:
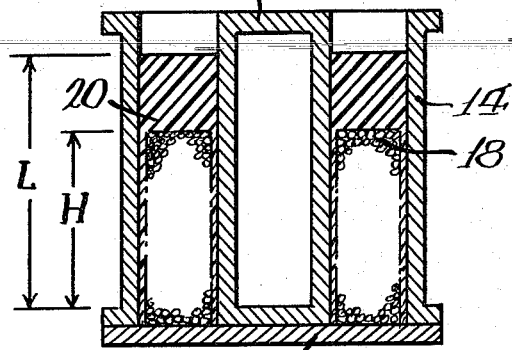
FIG. 2 is a cross-sectional view of the mold shown in FIG. 1 showing the prior art method.

FIGS. 1 and 2 of the drawings disclose the prior art method of forming a cast resin electrical coil. FIG. 2 discloses an inner mold or mandrel 12 that is usually circular in cross-section and an outer mold 14 which is spaced from the inner mold and has a closed bottom end 16. In the prior art method of forming a cast resin electrical coil, a wound induction element 18 is introduced around the periphery of the mandrel or inner mold 12 to produce a coil that would ultimately have a height (H). The induction element or wire coil spans the distance from the bottom wall 16 to the height (H). The outer mold in all instances would be slightly higher than the height of the finished coil.

A heated or molten resin material was then introduced into the space between the molds and sufficient material is provided to completely cover the wire coil and also have an amount of excess material above the coil to a height of approximately L, as shown in FIG. 2. The molten resin was then allowed to cure, and during such curing process, shrinkage occurs. The excess material above the height of the coil settles downwardly and compensates for, or replaces, the shrunken material above the wire coil. After the molten resin is completely cured, the outer mold is removed and the cast resin is removed from the inner mold or mandrel 12.

The last step of the prior art process of forming the cast resin power transformer coil is to remove the excess material about the height (H) of the coil. In the prior art process, this is accomplished by utilizing a conventional saw or other cutting device to cut a coil along the upper edge of the wire coil along a line generally designated by reference numeral 20.

As indicated above, this method is rather undesirable in that it creates a substantial amount of dust while cutting with the saw which can present a health hazard, particularly when the sawing must be done in a confined environment. Furthermore, this process is also rather time consuming and adding to the overall cost of the finished coil.

According to the present invention, a unique system has been developed for producing cast resin power transformer coils which eliminates the need for any subsequent cutting operations and reduces the time required for producing a coil.

Figure 3:
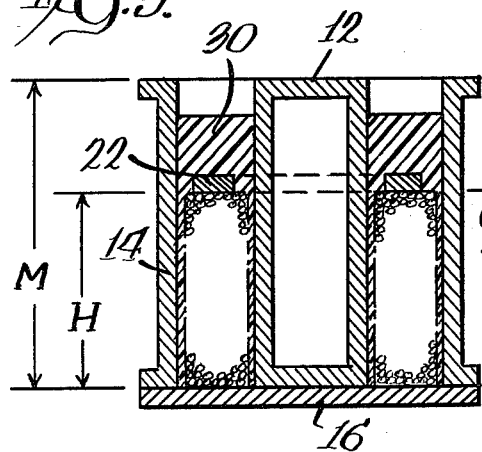
FIG. 3 is a cross-sectional view similar to FIG. 2 showing the features of the present invention.
Figure 4:
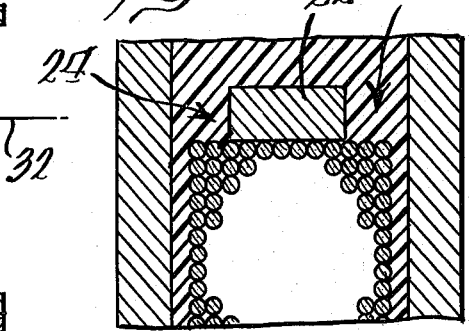
FIG. 4 is an enlarged fragmentary sectional view of a portion of the mold shown in FIG. 3.

As illustrated in FIGS. 3 and 4 of the drawings, a novel method of producing a coil is disclosed. As shown, the inner and outer molds 12 and 14 are identical in construction to the prior art molds. In the inventive process of the present invention, a wound induction element is first inserted over the inner mold or mandrel 12. This may be done by placing the mandrel on a winding lathe and winding a coil of wire on the mandrel to a predetermined thickness and/or length, which is less than the length of the outer mold. An adjustable ring 22 is then positioned on the mandrel in contiguous engagement with the end of the length of the wound coil, while the opposite end is in juxtaposed relation to the end of the mandrel which ultimately becomes the bottom end in the mold. The adjustable ring 22 is coated with a mold release material, as will be described later. Ring 22 has a width less than the annular space between the two molds to produce annular spaces 24 and 26. After the components have been positioned as described below, the outer mold 14 is placed in surrounding relation to the inner mold with the closed bottom being engaged with the end of the inner mandrel which has the wire coil in juxtaposed relation therewith. It will be noted that the length or height of the mold (M) is greater than the length or height of the coil of wire on the mandrel.

The next step in the process is to place the components in an autoclave where the components are heated, dried and evacuated to remove any impurities therefrom. A molten or liquid resin material is then introduced into the space between the adjustable ring and the bottom of the mold to fill the entire space and encapsulate the coil of wire with the resin material. An additional amount of material is supplied to produce a reservoir of resin material 30 above ring 22.

The mold with the resin material is then allowed to cool to cure the material where shrinkage occurs. This shrinkage is replaced by the excess material in reservoir 30 which flows through annular spaces 24 and 26.

The molds are then removed and the adjustable ring along with the excess material is removed to provide a finished coil of predetermined length. This last step is preferably formed by holding the coil and encapsulating resin material and striking the reservoir portion of the material and the ring with a mallet to produce a clean cut along line 32 to produce a finished coil having a height (H).

Figure 5:
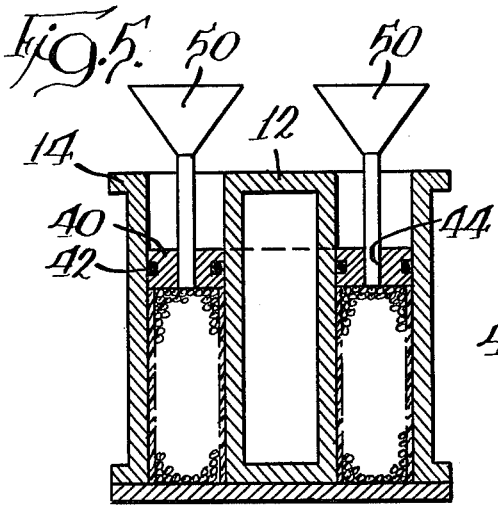
FIG. 5 is a cross-sectional view similar to FIG. 3 showing the modified form of the invention; and, FIG. 6 is a view similar to FIG. 4.
Figure 6:
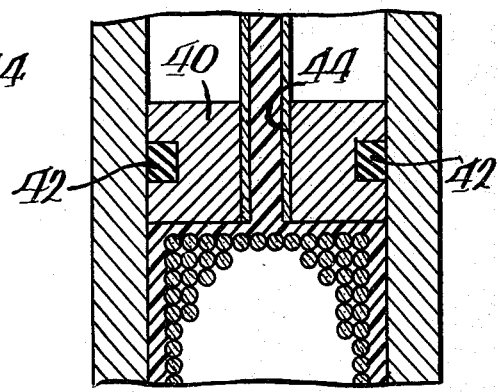

A slightly modified form of the invention is illustrated in FIGS. 5 and 6 wherein the inner and outer molds 12 and 14 are identical. In the modified form of the invention, annular ring 40 has a width which is substantially equal to the annular space between molds 12 and 14. Sealing rings 42 are positioned in recesses along the inner and outer edges of the adjustable ring 40 to produce a seal between the adjacent surfaces of the mold. In this embodiment of the invention, a plurality of circumferentially-spaced openings 44 are provided intermediate the inner and outer edges of ring 40 to provide communication between the spaces above and below the adjustable ring 40. In the embodiment illustrated in FIGS. 5 and 6, individual reservoirs, such as at 50, are provided for each of the openings to compensate for shrinkage during curing, as explained above. As the resin enters the mold, means for enabling air to escape from the mold, such as an air vent or a vacuum, must be included in the embodiment.

In this embodiment, the method steps for producing the finished encapsulated cast resin coil are the same as that described in connection with FIG. 3.

While not limited to particular materials, one type of release material that operated successfully for its intended purpose was a mixture of silicone and acetone. The resin that has been used successfully was a mixture of bisphenol epoxy and anhydrite hardener.

As can be appreciated by the above description, a very simplified form of producing an electrical coil has been provided wherein the amount of time necessary for producing such coil is substantially reduced and a better produce is derived therefrom.

Numerous modifications come to mind without departing from the spirit of the invention. For example, the ring 40 and seals 42 could be utilized without individual reservoirs or funnels 50 and the entire area above ring 40 would act as a single reservoir. The mandrel or inner mold could have a height equal to the desired height of the finished coil and the metal ring could extend across the upper edge of the inner mold, as well as the spaced occupied by the coil of the wire.

Furthermore, in some instances it may be desirable to utilize a ring 22 or 40 along both the upper and lower edges of the finished coil. In other instances it may be desirable to simultaneously produce two coils in one mold. This could be accomplished with two spaced rings in one mold.

We claim:

1. A method of forming a cast resin electrical coil comprising the steps of inserting a wound induction element around an inner mold; positioning an outer mold having a closed bottom around said inner mold for forming a space therebetween; coating a ring with a layer of release material; positioning said ring between said inner and outer molds and spaced from the closed bottom; providing communication between the spaces on opposite sides of said ring, introducing a liquid cast resin material between said molds to fill the space between said bottom and said ring and with excess resin material above said ring; curing said resin material and allowing said excess resin material to flow from above said ring into the space between said ring and said bottom to accommodate for shrinking of said resin during curing; separating said molds from said material; and separating said ring and excess resin material from the case resin electrical coil.

2. A method as defined in claim 1 in which said ring is positioned at the exact height of a desired length of said coil and the portion of resin above said ring.

3. A method as defined in claim 1 wherein said communication is provided through an intermediate portion of said ring.

4. A method as defined in claim 3 in which said ring has spaced openings producing said communication, including the further steps of placing a separate reservoir in communication with each opening for said excess resin material.

5. A method as defined in claim 1 wherein at least a portion of an edge of said ring is spaced from an adjacent surface of one of said molds to produce said communication.

6. A method as defined in claim 5 wherein at least a portion of each edge of said ring is spaced from an adjacent surface of an associated mold.

7. A method of forming a cast resin electrical coil comprising:
   inserting a coil of wire around an inner mold;
   positioning an air filled outer mold having a closed bottom around said inner mold and coil of wire with the top of said mold extending above said coil of wire;
   coating a ring with a release coating;
   inserting said ring into said outer mold above said coil of wire and below said top to produce a reservoir above said member, said ring having openings providing communication between said coil of wire and said reservoir;
   introducing resin into said outer mold to encapsulate said coil of wire and provide excess resin above said ring;
   removing the air from the mold as it fills with resin;
   curing said resin;
   removing said inner and outer molds; and, separating said ring and said excess resin to produce an encapsulated coil of predetermined length.

8. A method as defined in claim 7 in which said inner mold extends above said coil of wire and said ring is positioned between said inner and outer molds.

* * * * *